Figure 1:
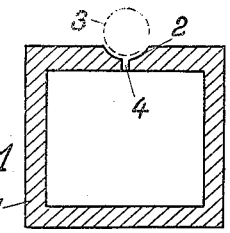

Aug. 13, 1940.                    E. BRAUN                    2,211,490
       PROCESS AND APPARATUS FOR SIMULTANEOUSLY
         DRYING AND CONVEYING TUBULAR PRODUCTS
                 Filed March 19, 1938          2 Sheets-Sheet 1

Inventor.
E. Braun
By E. F. Wendroth
     Atty

Aug. 13, 1940.                    E. BRAUN                    2,211,490
PROCESS AND APPARATUS FOR SIMULTANEOUSLY
DRYING AND CONVEYING TUBULAR PRODUCTS
Filed March 19, 1938            2 Sheets-Sheet 2

Inventor:
E. Braun

Patented Aug. 13, 1940

2,211,490

UNITED STATES PATENT OFFICE 2,211,490

PROCESS AND APPARATUS FOR SIMULTANEOUSLY DRYING AND CONVEYING TUBULAR PRODUCTS

Emil Braun, Weinheim, Baden, Germany, assignor to Naturin-Werk Becker & Co., Weinheim, Baden, Germany Application March 19, 1938, Serial No. 197,039
In Germany March 19, 1937

9 Claims. (Cl. 34—24)

It is known to manufacture tubular products, which may for example be used as artificial sausage skins, from solutions or fibrous masses of vegetable or animal origin. The drying of the tubes is effected by inflating them with gas and conveying the inflated tubes through long drying chambers, in which hot air or another hot gas plays over them from all sides.

In the continuous production of tubes the conveyance of the endless tube obtained by extruding the initial masses through nozzles was effected during drying by leading the tube over suitably driven conveyor belts disposed at relatively large intervals. In the intervals between the conveyor belts the tube passed over a plurality of freely rotating supporting rollers.

The known drying and conveying process was attended with numerous disadvantages. Since the drying in the known processes is dependent on the speed of conveyance of the tube and on the distance traversed by the tube during drying, increased production and the correspondingly necessary increased speed of conveyance could only be compensated by correspondingly lengthening the drying stretch. A further disadvantage is to be found in the complicated device, consisting of a plurality of individual elements, for guiding the tubes to be dried through the drying channel. The conveyor belts, supporting rollers and the like required constant attention, adjustment and alignment. Moreover they exerted an unfavourable effect at their points of contact with the tube to be dried, since at these positions the action of the dry air was interrupted, whereby the uniformity of the products was impaired. It was also found that the elasticity of the tubes was considerably diminished, owing to stresses produced by friction against the conveyor elements and by tension at increased speed of conveyance or increased distance of travel. Accordingly cases occurred where the tubes, when being for example used as artificial sausage skins, burst on being filled or during boiling.

According to this invention it has been found that tubular products can be dried and conveyed without the aforesaid disadvantages occurring, by conveying the tube to be dried in a suspended condition in countercurrent to a hot stream of gas.

For this purpose the tube, produced for example by extrusion through an annular nozzle, is conveyed whilst inflated with gas over a channel, from which a hot gas flows through narrow openings in countercurrent to the tube.

It has been found thereby that the tube becomes suspended in the gas stream and is not blown away by the latter. This phenomenon is based on the known physical principle, according to which a gas jet flowing out of a narrow opening attracts a surface disposed in front of this opening.

The hot gas stream plays over the tube on all sides and the latter is dried and can be conveyed further without any appreciable friction.

The advantages offered by the process of this invention are very considerable. Conveyor belts and guiding or conveying rollers are no longer required, so that the expenses of providing, attending to and repairing the same are saved. The tubular product is now conveyed over the drying stretch without any appreciable resistance; it is accordingly subjected to only a slight frictional resistance, which is of great importance in view of the mechanically extremely sensitive structure of an artificial tubular product undergoing drying. Losses owing to discarded products are kept within narrow limits. Finally, drying proceeds much more rapidly than in any other drying apparatus, so that the drying stretch can be considerably shortened without impairing the efficiency of drying, which very substantially reduces the cost of production.

The procedure is, with advantage followed of drying the product issuing from the annular nozzle, in the form of an endless tube. Air is blown from the nozzle head into the interior of the tube being formed and the tube is dried in this condition.

According to the process of this invention the endless tube inflated with gas is conveyed over a channel, in the walls of which narrow gas outlets are provided below the tubular product. The drying gas is blown by a blower over a pre-heater into the channel. The operation is carried out at relatively low pressures corresponding to at least 90 to 100 mms. water column, preferably 120 to 150 mms. water column. In special cases, for example when drying coronary sausage skins or tubes, pressures corresponding to at least 160 to 200 mms. water column are employed.

The gas outlets may be disposed longitudinally in the upper walls of the channel. In the production of so-called coronary sausage skins or tubes a tubular channel or conduit, corresponding in diameter to that of the ring or corona to be formed, may be employed for supplying the drying gas. In this case the gas outlets are disposed spirally in the walls of the channel. When a relatively long drying stretch is employed, the tubular channel or conduit is supplied with drying gas from a separate supply conduit. This supply conduit is connected with the tubular channel by means of connecting tubes disposed at certain intervals.

The gas outlets may be constructed in the form of one continuous narrow slot. In cross-section the slot appears as a nozzle with parallel or even conical lateral surfaces. The drying channel may also be provided with a plurality, preferably two, parallel continuous narrow slots, separated by a small interval, the slots being if desired disposed at an acute angle to one another in the direction of the material to be dried.

The interval separating the slots depends on the material to be dried; for example in the case of two slots an artificial tubular product of 40 mms. internal diameter requires a slot interval of 10 to 15 mms. and a tubular product of 90 mms. a slot interval of about 25 to 30 mms. The width of the slot amounts to from 2 to 4 mms. depending on the internal diameter.

According to a further embodiment of this invention the gas outlets may consist of one or more, preferably two, parallel continuous rows of openings separated by a small interval and for example of circular or rectangular cross-section. It has been found that with this arrangement it is possible to operate with particular certainty. When rectangular in cross-section, each individual opening is about 20 to 40 mms. in length. The distance between the individual openings in a longitudinal direction likewise amounts to from 20 to 40 mms. The openings of circular cross-section must be suitably spaced to give the same total cross-section of opening. The circular openings are for example 4 to 6 mms. in diameter. The openings may with advantage also be constructed as conical shallow nozzles.

The axes of the openings arranged in two or more parallel rows may be disposed parallel or at an acute angle to one another in the direction of the material to be dried. Finally the axes of the openings may also be disposed at an acute angle to the axis of the tubular product in the direction of its travel, so that the conveyance is assisted by the gas stream.

If the drying apparatus is provided with a continuous slot or a row of openings arranged in series, a semi-circular recess corresponding in diameter to the tube to be dried is with advantage provided in the upper side of the channel wall. At the deepest part of the recess a gas outlet or outlets is or are disposed.

When employing two or more continuous slots or rows of nozzles, guiding strips or ledges are with advantage provided on both sides thereof. These are triangular in cross-section, the sides facing the openings being inclined at an angle of about 40°.

Various embodiments of apparatus according to this invention are illustrated in the accompanying drawings.

Figure 1 is a cross-section through a rectangular channel or conduit 1 for supplying the drying gas. A semi-circular recess 2 corresponding in diameter to the tubular product 3 is provided in the upper wall of the channel. A slot 4 is disposed at the deepest part of the recess.

Figure 2:
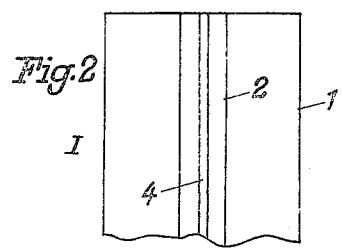

Figure 2 is a plan view of the channel 1 with recess 2 illustrated in Figure 1. In the embodiment I a continuous narrow slot 4 is provided, in the embodiment II the continuous slot is replaced by a series of individual rectangular openings 5 and in the embodiment III by a series of individual circular openings 6.

Figure 3:
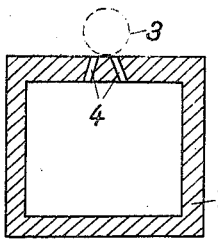

Figure 3 is a cross-section through a rectangular channel 1, in the upper wall of which two slots 4 are provided, which are conically tapered in the upward direction and the axes of which are disposed at an acute angle to one another in the direction of the material to be dried.

Figure 4:
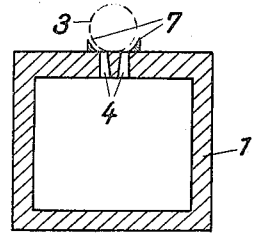

In the embodiment shown in cross-section in Figure 4, the two slots 4 are disposed between two guiding strips 7 disposed on the upper wall of the channel. These guiding strips are not absolutely necessary, but advisable.

Figure 5:
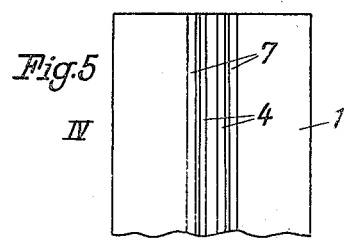

Figure 5 is a plan view of the channel 1 illustrated in Figure 4. In the embodiment IV two parallel continuous narrow slots 4, separated by a small interval, and corresponding guiding strips 7 are provided. In the embodiment V the continuous slots are replaced by two rows of individual rectangular openings 5 and in the embodiment VI by two rows of circular openings arranged in series.

Figure 6:
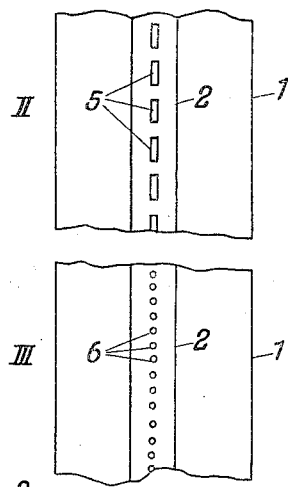
Figure 6:
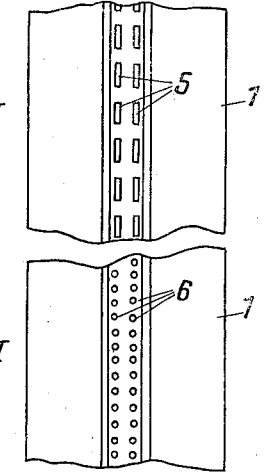
Figure 6:
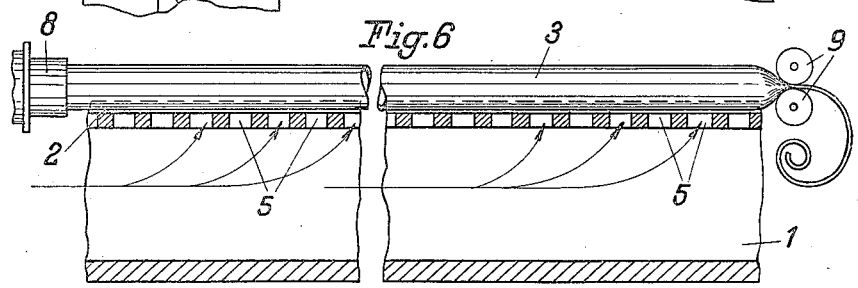

Figure 6 diagrammatically illustrates the process, according to which the tubular product 3 extruded from the annular nozzle 8 is guided along the recess 2 in the channel 1 (shown in longitudinal section) whilst hot gas flows perpendicular thereto through the openings or outlets 5. Two rollers 9, between which the tube is compressed, are disposed at the end of the drying channel, so that the air blown in cannot escape. The flat compressed tube is thereafter rolled up.

Figure 7:
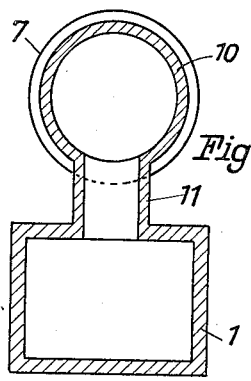
Figure 8:
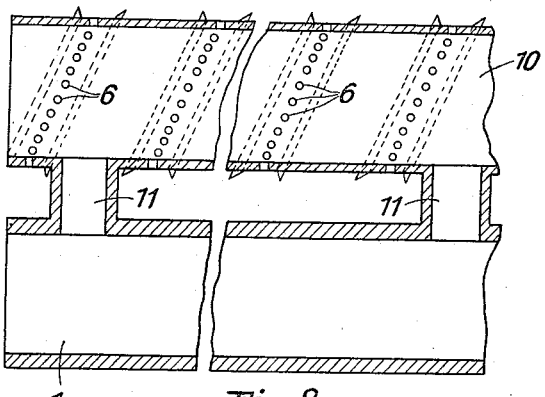

Figure 7 is a cross-section through a tube 10, to which the hot gas is supplied through connecting tubes or ducts 11 from the drying channel or conduit 1. Figure 8 is a longitudinal section of the embodiment illustrated in Figure 7. In this embodiment the tubular product is conveyed spirally round the tube 10 and the connecting ducts 11 are disposed at intervals between a plurality of the spirals. The number of the connecting ducts and the intervals between the same depend on the degree of drying required. In the case of relatively short drying stretches the drying gas may be passed directly through the tube 10.

Figure 9:
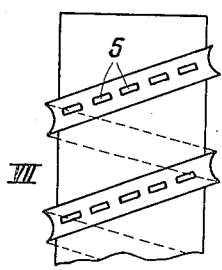

In the embodiment illustrated in Figures 8 and 9 the gas outlets are disposed spirally. In the specific embodiment VII one row of rectangular slots 5 is disposed between the correspondingly spirally proceeding guiding strips 7, in the specific embodiment VIII two rows of rectangular slots 5 and in the specific embodiment IX two rows of circular openings 6 are so disposed.

Figure 10:
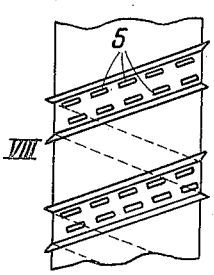
Figure 10:
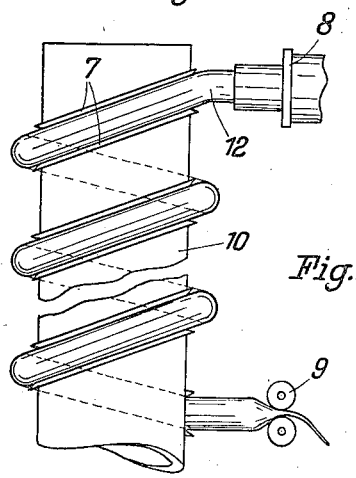

Figure 10 diagrammatically illustrates the drying and conveying of so-called coronary artificial tubes. The tube 12 extruded from the annular nozzle 8 is conveyed spirally round the tube 10 over the gas outlets and between the guiding strips 7. At the end of the drying stretch the tube is compressed by the rollers 9 and thereafter rolled up.

Figure 11:
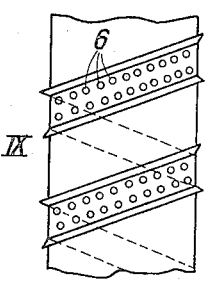
Figure 11:
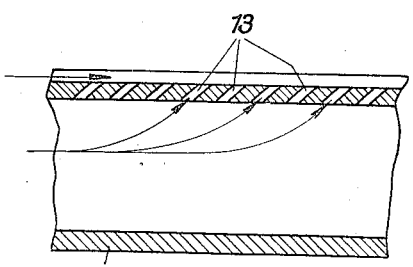

In the embodiment illustrated in longitudinal section in Figure 11 the gas outlets 13 of the drying cannel or conduit 1 are disposed at an acute angle to the axis of the tubular product in the direction of its travel.

The drying process of this invention may be applied with particular success to tubes, which have been prepared from plastic kneadable fibrous masses of animal origin, for example in accordance with the process of U. S. A. patent applications, Serial Nos. 554,919, 695,376 and 80,647.

What I claim is:

1. A drying apparatus comprising a conduit having a series of ports, means for guiding a gas inflated tubular structure parallel to the ports in said conduit, means for discharging a heated gas through said ports so as to support said tubular structure in said heated gas current away from said conduit and said ports being disposed helically in the wall of said conduit.

2. A drying apparatus comprising a conduit having a semi-circular recess in the wall thereof, means for advancing a tubular structure to be dried parallel to the direction of said recess, said conduit having openings located in said recess and means for ejecting heated gas through said openings so as to support said tubular structure during drying by said heated gas.

3. A drying apparatus comprising a conduit having two rows of openings therein, said rows being spaced slightly from one another, said rows of openings being disposed at an acute angle to one another so as to cause air passing therethrough to intersect outside said conduit, means for advancing a tubular structure to be dried above said openings and means for ejecting heated gas through said openings so as to support said structure during drying by said heated gas.

4. A method of drying advancing tubular structures comprising inflating a tubular structure with a gas and then maintaining said gas inflated tubular structure in suspension against the force of gravity by a current of heated gas.

5. A method of drying tubular structures which comprises inflating a tubular structure with a gas, then passing said tubular structure over a conduit and ejecting a hot gas from openings in said conduit directed towards said tubular structure in order to suspend said tubular structure in said hot gas and thereby dry the same.

6. A method of drying a tubular structure comprising inflating said tubular structure with a gas so as to assist in suspending the same, then passing said gas inflated tubular structure parallel to and above a conduit having openings therein and ejecting a heated gas upwardly through said openings to complete the suspension of said structure against the force of gravity.

7. A drying apparatus comprising means for inflating a tubular structure, a conduit having an opening therein, means for advancing said gas inflated structure above said opening and means for ejecting heated gas through said opening so as to support said structure during drying by said heated gas.

8. A drying apparatus comprising a fixed conduit having a series of openings therein, guide bars located on each side of said openings, means for advancing a tubular structure to be dried between and above said guide bars and means for ejecting heated gas upwardly through said openings towards said tubular structure to support said tubular structure during the drying thereof.

9. A drying apparatus comprising a conduit having a series of ports disposed helically in the wall thereof, guiding means on said conduit on each side of said ports, means for advancing a tubular structure to be dried between said guiding means and means for ejecting a heated gas through said ports towards said tubular structure to support said tubular structure away from said guiding means during the drying thereof by said heated gas.

EMIL BRAUN.